United States Patent
Ahn (10) Patent No.: US 7,372,492 B2
(45) Date of Patent: May 13, 2008

(54) IMAGE SENSOR HAVING RESET COMPENSATION BLOCK

(75) Inventor: Hyun-Joo Ahn, Ichon-shi (KR)

(73) Assignee: Magnachip Semiconductor, Ltd., Chung Cheon Bok-Do (KR)

( * ) Notice: Subject to any disclaimer, the term of this patent is extended or adjusted under 35 U.S.C. 154(b) by 766 days.

(21) Appl. No.: 10/835,825

(22) Filed: Apr. 29, 2004

(65) Prior Publication Data

US 2004/0252214 A1 Dec. 16, 2004

(30) Foreign Application Priority Data

Apr. 30, 2003 (KR) .................... 10-2003-0027736

(51) Int. Cl.
- *H04N 3/14* (2006.01)
- *H04N 5/335* (2006.01)
- *H01L 27/00* (2006.01)

(52) U.S. Cl. .................... 348/308; 348/302; 205/208.1
(58) Field of Classification Search ................ 348/294, 348/300–310; 250/208.1, 214.1
See application file for complete search history.

(56) References Cited

U.S. PATENT DOCUMENTS

| | | | |
|---|---|---|---|
| 6,423,957 B1 * | 7/2002 | Kim et al. | 250/208.1 |
| 6,555,805 B2 * | 4/2003 | Afghahi | 250/208.1 |
| 2003/0052976 A1 * | 3/2003 | Harada et al. | 348/220.1 |
| 2003/0169357 A1 * | 9/2003 | Kubo | 348/296 |
| 2003/0174220 A1 * | 9/2003 | Ito | 348/240.2 |

\* cited by examiner

*Primary Examiner*—Ngoc-Yen Vu
*Assistant Examiner*—Christopher K Peterson
(74) *Attorney, Agent, or Firm*—Blakely, Sokoloff, Taylor & Zafman LLP (57) ABSTRACT

An image sensor for obtaining a digital image data by using a correlated double sampling method unrelated to an intensity of inputted light includes a pixel array including N×M unit pixels; a reset voltage check block for receiving each reset signal outputted from each unit pixel and comparing a level of each reset signal with a minimum level of a preferable reset signal to thereby generate a reset compensation control signal; a reset voltage compensation block for compensating the reset signal outputted from each unit pixel in response to the reset compensation control signal to generate a compensated reset signal; and an analog to digital converter for deriving an analog image data by using a data signal outputted from the pixel array and the compensated reset signal to convert the analog image data into the digital image data.

8 Claims, 7 Drawing Sheets

- RESET SIGNAL LEVEL(Pr)
- MINIMUM LEVEL OF PREFERABLE RESET SIGNAL(Pf)

FIG. 7

IMAGE SENSOR HAVING RESET COMPENSATION BLOCK

FIELD OF INVENTION

The present invention relates to an image sensor; and, more particularly, to the image sensor capable of preventing a phenomenon that a detected object, e.g., a light source, becomes darker than its original when strong light is inputted from the object.

DESCRIPTION OF PRIOR ART

Generally, an image sensor is called a device for picking up light images by using a property of a semiconductor which can react to the light. The image sensor can be typically classified into a charge coupled device CCD and a complementary metal oxide semiconductor CMOS device. In the CCD image sensor, a lot of electron carriers generated by reacting to the light are stored in a MOS capacitor and, then, are transmitted to an output device, e.g., a display.

Meanwhile, the complementary metal oxide semiconductor (hereinafter, referred to a CMOS) devices are generally used in image sensors. A CMOS image sensor is designed by using a CMOS technology for designing a general sensor core control block or a signal processing block. In the CMOS image sensor, each pixel outputs electrical signals converted from optical values detected by each photodiode. Then, each MOS transistor connected to each pixel delivers the converted electrical signals to a signal processing unit.

Recently, the CMOS image sensor is diversely used for some appliances related to personal computer (PC) cameras, mobile terminals, toys, medical facilities and the like. Also, according to change of light amount inputted from the object, an operation of the CMOS image sensor can be adjusted by a user or an external controller because the CMOS image sensor is operated after receiving the light of image information.

Figure 1:
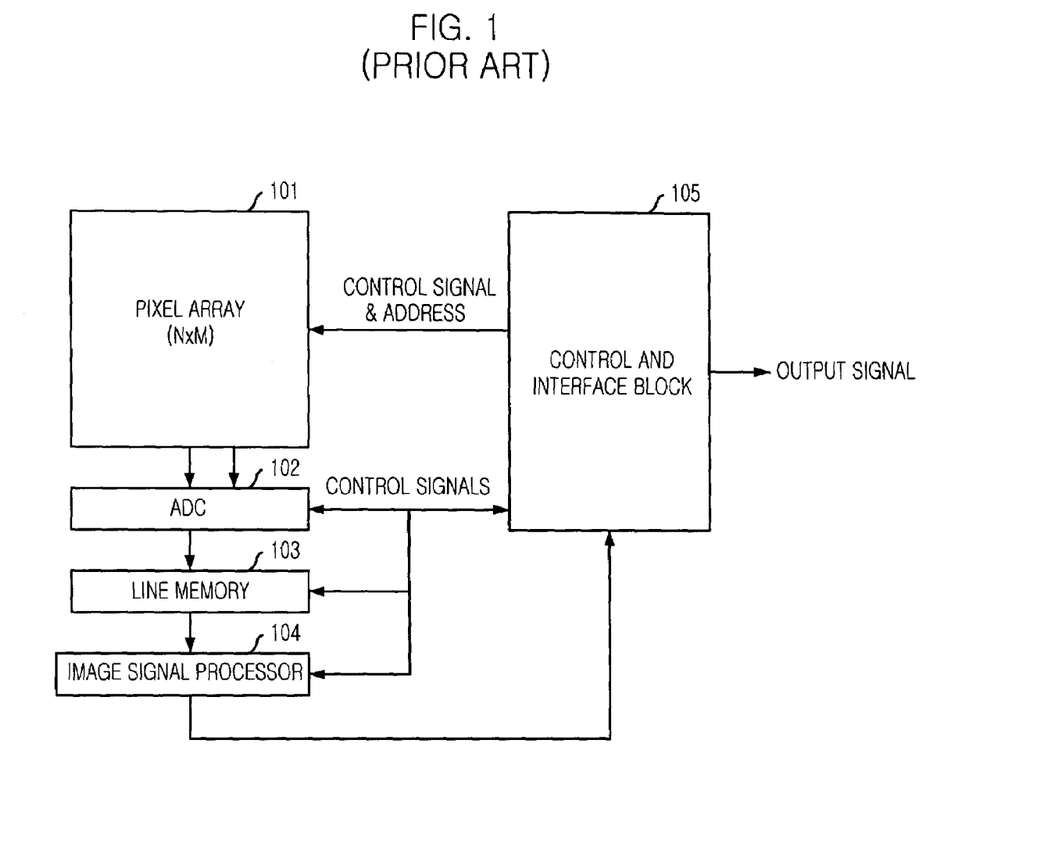
FIG. 1 is a block diagram describing a conventional complementary metal oxide semiconductor (CMOS) image sensor.

FIG. 1 is a block diagram describing a conventional CMOS image sensor.

As shown, the conventional CMOS image sensor includes a pixel array 101, an analog to digital converter (ADC) 102, a line memory 103, an image signal processor 104 and a control and interface block 105.

In detail, the pixel array 101 includes a plurality of unit pixels which can react to the light reflected from an object and generate an analog electric signal, which is usually constituted with a lot of photo-electrons, in response to the light. Furthermore, as shown, the pixel array 101 has N×M unit pixels (herein, N and M are positive integers). Meanwhile, the analog electric signal outputted from each unit pixel of the pixel array 101 should be converted into a digital electric signal in order to be processed in a digital system. It is a reason why the analog to digital converter (ADC) 102 is included in the conventional CMOS image sensor.

The digital electric signal converted by the ADC 102 stores in the line memory 103. Herein, the line memory 103 includes a plurality of unit line memories. Each unit line memory is served as a buffer for helping functions of the image signal processor 104. The image signal processor 104 performs a lot of functions, e.g., a color interpolation, a color correction, an auto white balance, an auto exposure, a gamma correction, a color space conversion, an image adjustment, an edge enhancement, an auto focus, an auto zoom and the like. Using the above functions, the image signal processor 104 improves a quality of the digital electric signal, i.e., the data signal outputted from the pixel array 101.

Lastly, the control and interface block 105 uses a finite state machine FSM for controlling a lot of internal operations of the CMOS image sensor and providing an interface between the CMOS image sensor and an external system. Also, the control and interface block 105 has a register, i.e., a kind of storage, for programming the internal operations of the CMOS image sensor. Namely, according to the programmed internal operations in the register, the control and interface block 105 controls the CMOS image sensor.

Figure 2:
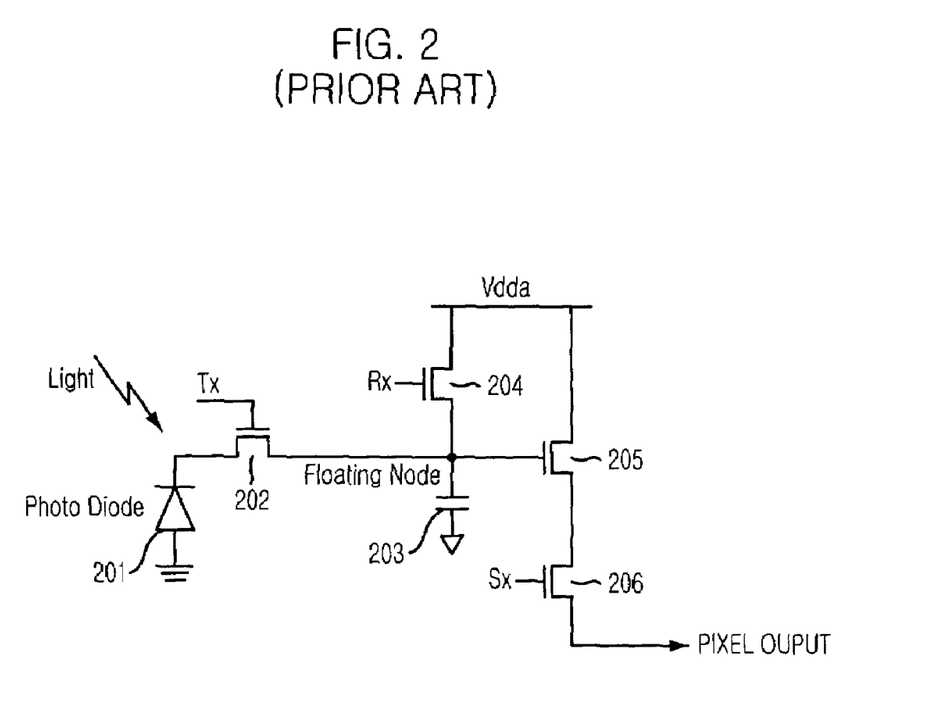
FIG. 2 is a circuit diagram showing a unit pixel in the conventional CMOS image sensor.

FIG. 2 is a circuit diagram showing a unit pixel included in the pixel array 101 of the conventional CMOS image sensor. As shown, the unit pixel is constituted with one photodiode 201 and four MOS transistors 202,. 204, 205 and 206.

In detail, the photodiode (PD) 201 generates the photo-electrons in response to the inputted light. A transfer transistor (Tx) 202 is for transmitting the photo-electrons from the photodiode (PD) 201 to a floating node FN. A reset transistor (Rx) 204 coupled to a supply voltage Vdd resets the floating node FN to a predetermined level by eliminating the photo-electrons charged in a capacitor 203 of the floating node FN. A driving transistor (Dx) 205 served as a source follower buffer amplifier has a gate coupled to the floating node FN. Lastly, a select transistor (Sx) 206 served as a switch has a gate coupled to an address signal.

The CMOS image sensor includes a plurality of unit pixels, e.g., about millions or hundred thousands unit pixels, which is described above. As a result, in the CMOS image sensor, a fixed pattern noise is occurred by an offset voltage which is generated by little difference or error during a manufacturing process.

In order to compensate the fixed pattern noise, the image sensor should read a data signal after reading a reset signal of each pixel. After reading the reset signal and the data signal, the image sensor outputs the difference between the reset signal and the data signal. This way is called as a correlated double sampling method (hereinafter, referred as CDS method).

Figure 3A:
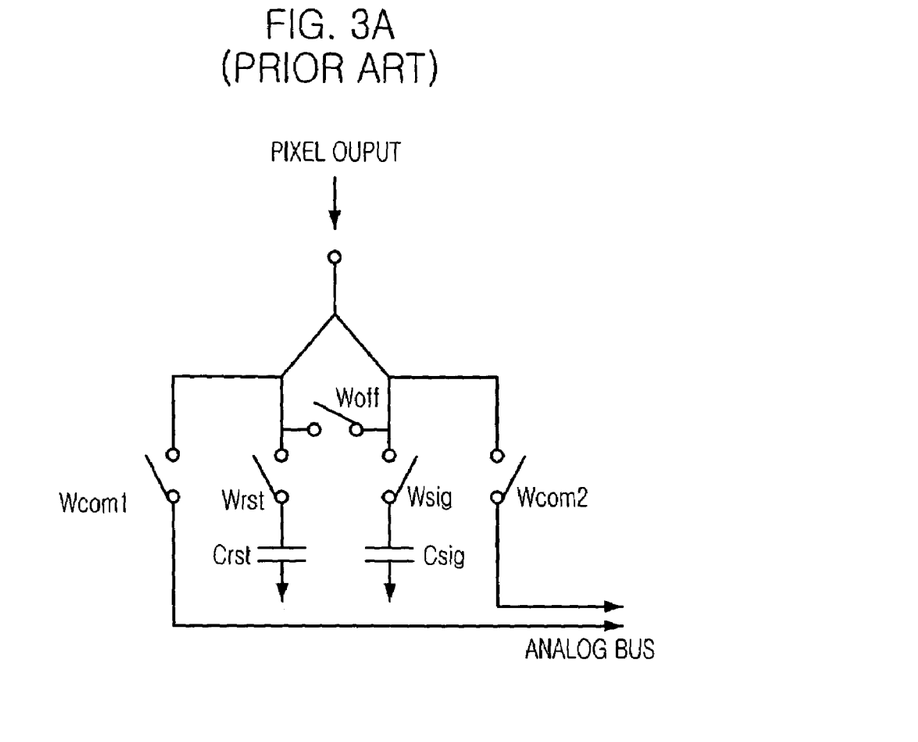
FIG. 3A is a circuit diagram describing a partial portion of the conventional CMOS image sensor using a correlated double sampling (CDS) method.
Figure 3B:
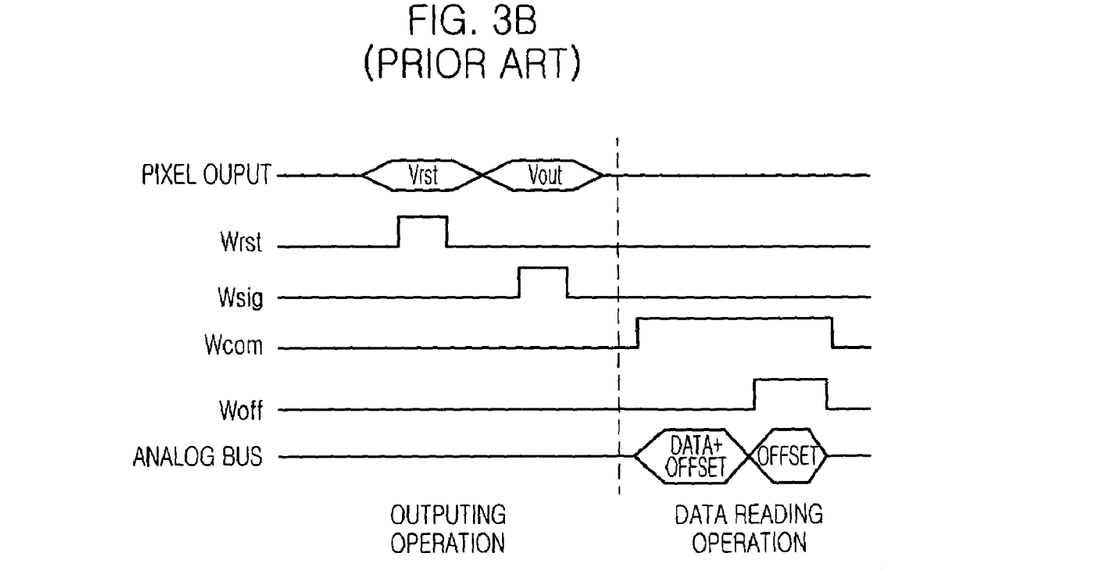
FIG. 3B is a waveform showing the CDS method in the conventional CMOS image sensor.

FIG. 3A is a circuit diagram describing a partial portion of the conventional CMOS image sensor using the CDS method. Also, FIG. 3B is a waveform showing the CDS method in the conventional CMOS image sensor.

First of all, a first switch Wrst and a second switch Wsig are sequentially turned on and, then, each of the reset signal and the data signal is stored in each of first and second capacitors Crst and Csig.

Next, two third switches Wcom1 and Wcom2 are turned on. Then, the data signal and an offset voltage are outputted through an analog bus. At this time, if a fourth switch Woff is turned on, the offset voltage except for the data signal is outputted through the analog bus.

Lastly, a pure data signal can be obtained by subtracting a first output value, i.e., a summation of the data signal and an offset voltage, with a second output value, i.e., the offset voltage.

Referring to FIG. 3B, it is easy to understand the described operation of the CMOS image sensor, i.e., a process for deriving the pure data signal by using the correlated double sampling method.

Using CDS method so that the fixed pattern noise is eliminated by outputting the difference between the reset voltage signal and the data voltage signal, the image sensor shows bright or dark objects in an output picture. However, the conventional image sensor cannot naturally reproduce an bright object, e.g., a light source like sun emitting strong light or something to reflect the strong light because the difference between the reset voltage signal and the data voltage signal is decreased.

Namely, if a voltage level of the reset signal outputted from each unit pixel included in the pixel array 101 is not kept in a predetermined preferable range, an image signal, i.e., the pure data signal, can be distorted even through the CDS method is used in the CMOS image sensor.

Hereinafter, referring to FIG. 2, there is described why the difference between the reset voltage signal and the data voltage signal becomes small if a strong light of the bright object is inputted to the image sensor.

In CDS method, after the reset transistor Rx is turned on for resetting the floating node FN, a buffer (as not shown) stores value of sampling the reset signal. At this time, the floating node FN is supplied with the supply voltage, so the reset signal has relatively high voltage level. Contrary to the reset signal, a voltage level of the data signal is lower than that of the reset signal because the data signal is sampled after the photo-electrons are transmitted to the floating node FN.

However, in case about the bright object, the photo-generated charge is generated from not only the photodiode PD but also the floating node, because the floating node made by a PN junction is exposed to strong light emitted or reflected from the bright object. Namely, under the bright object, the floating node FN may generate a lot of photo-generated charge because the floating node serves as a photodiode.

A large amount of photo-generated charges generated by the bright object draws down the voltage level of the floating node FN by overcoming affect of the supply voltage VDD when the reset transistor Rx is turned on and the reset voltage signal is sampled.

After all, because the reset voltage signal becomes below a predetermined voltage, the unit pixel, in a reset state, outputs value which is similar to the data voltage signal. As a result, the reset voltage signal is not quite different from the data voltage signal, and the bright object is darkly reproduced. This dark phenomenon results in decreasing a quality of the image sensor related to image reproduction.

Figure 4A:
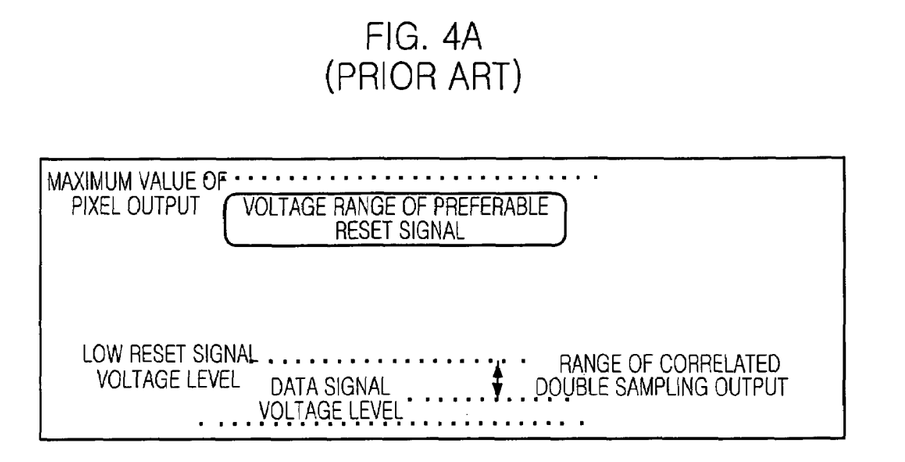
FIG. 4A is an explanatory diagram depicting a range of a pixel value outputted by the CDS method in the conventional CMOS image sensor when strong light is inputted from an object.

FIG. 4A is an explanatory diagram depicting a range of a pixel value outputted by the CDS method in the conventional CMOS image sensor when strong light is inputted from an object.

As shown, because the reset signal deviates from a voltage range of a preferable reset signal, the difference between a reset signal voltage level and a data signal voltage level may be pretty slight. As a result, a pixel value outputted from the unit pixel is decreased and, then, a detected image of object is darkly reproduced.

Thus, the above dark phenomenon should be prevented in order to guaranty a good product quality related to an optical characteristic of the image sensor using CDS method.

SUMMARY OF INVENTION

It is, therefore, an object of the present invention to provide an image sensor for establishing a minimum voltage level of a preferable reset signal and keeping a reset signal within a preferable voltage range in order to effectively reduce a dark phenomenon in a bright object, e.g., a light source to thereby improve a quality of an image sensor using CDS method In accordance with an aspect of the present invention, there is provided an image sensor for obtaining a digital image data by using a correlated double sampling method unrelated to an intensity of inputted light includes a pixel array including N×M unit pixels; a reset voltage check block for receiving each reset signal outputted from each unit pixel and comparing a level of each reset signal with a minimum level of a preferable reset signal to thereby generate a reset compensation control signal; a reset voltage compensation block for compensating the reset signal outputted from each unit pixel in response to the reset compensation control signal to generate a compensated reset signal; and an analog to digital converter for deriving an analog image data by using a data signal outputted from the pixel array and the compensated reset signal to convert the analog image data into the digital image data.

BRIEF DESCRIPTION OF DRAWINGS

The above and other objects and features of the present invention will become apparent from the following description of preferred embodiments taken in conjunction with the accompanying drawings, in which.

DETAILED DESCRIPTION OF THE INVENTION

Hereinafter, an image sensor for effectively reducing a dark phenomenon in a bright object, e.g., a light source to thereby improve a quality of an image sensor using a correlated double sampling (CDS) method, according to the present invention will be described in detail referring to the accompanying drawings.

Figure 4B:
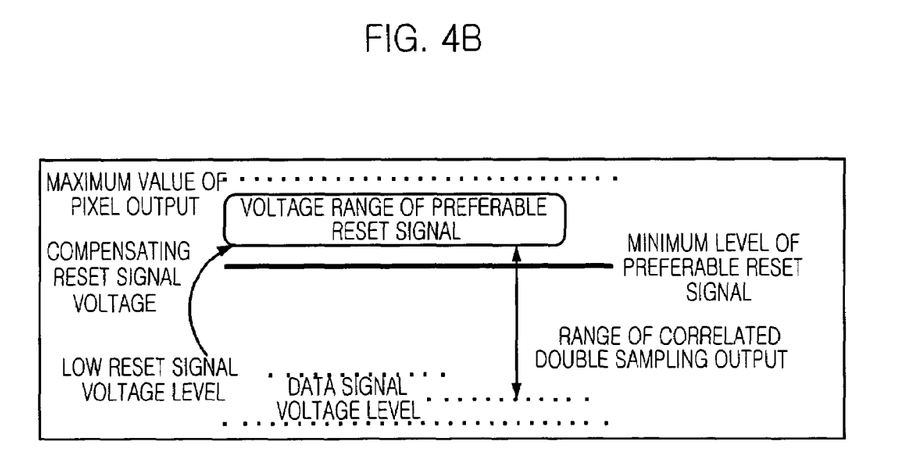
FIG. 4B is a figure depicting a range of a pixel value outputted by the correlated double sampling method in the conventional CMOS image sensor if a reset voltage level is compensated to a predetermined level when strong light is inputted from an object.

FIG. 4B is a figure depicting a range of a pixel value outputted by the CDS method in the conventional CMOS image sensor if a reset voltage level is compensated to a predetermined level when strong light is inputted from an object.

As shown, the image sensor in accordance with present invention establishes a minimum voltage level of a preferable reset signal and keeps a reset signal within a preferable voltage range. If the reset signal deviates from a voltage range of a preferable reset signal, a voltage level of the reset signal is compensated upper the minimum voltage level of a preferable reset signal.

Figure 5:
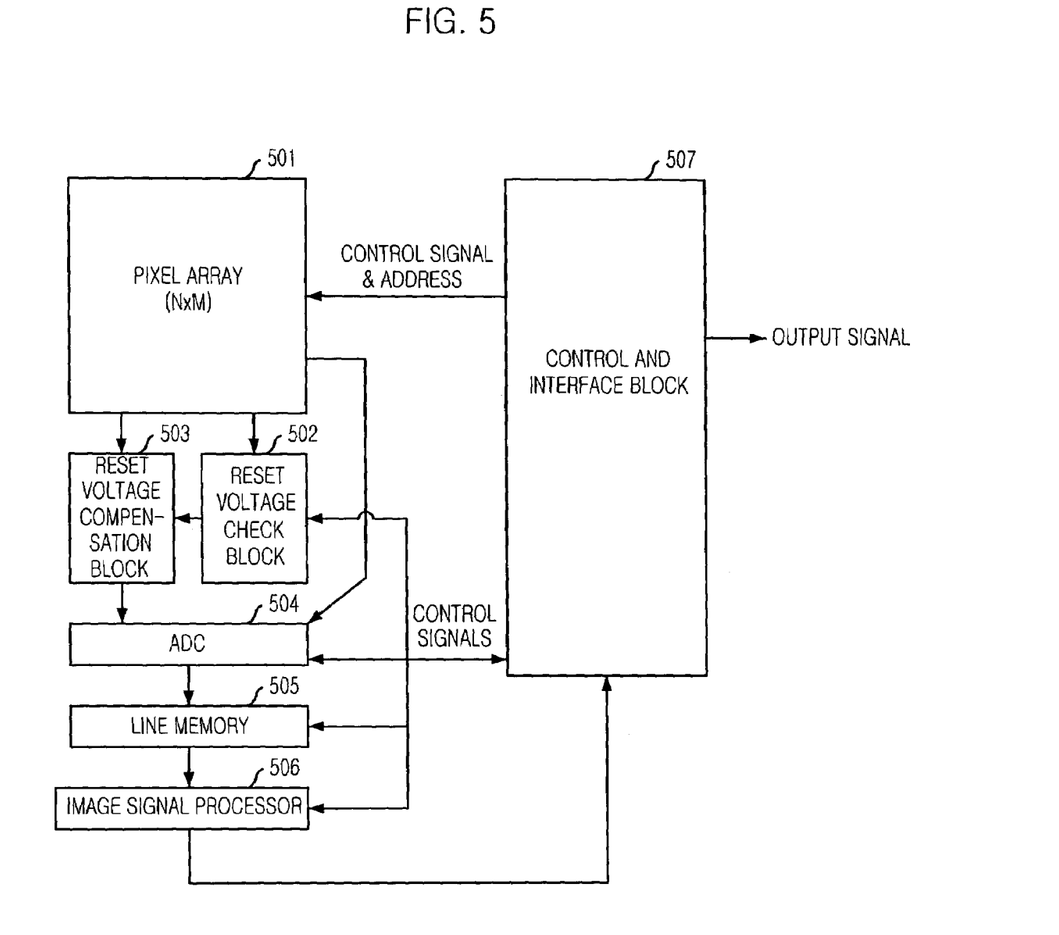
FIG. 5 is a block diagram showing a CMOS image sensor in accordance with the present invention.

FIG. 5 is a block diagram showing a CMOS image sensor in accordance with the present invention.

As shown, the image sensor includes a pixel array 501, a reset voltage check block 502, a reset voltage compensation block 503, an analog to digital converter 504, a line memory 505, an image signal processor 506 and a control and interface block 507.

In detail, the pixel array 501 includes N×M unit pixels (herein, N and M are positive integers). Each unit pixel reacts to the light inputted from an external circumstance and generates a lot of photo-electrons in response to the inputted light.

Then, a reset voltage check block 502 receives each reset signal outputted from each unit pixel and compares a level of each reset signal with the minimum level of the preferable reset signal to thereby generate a reset compensation control signal. Herein, the minimum level of the preferable reset signal is already described in FIG. 4B. Furthermore, at every frame, the reset voltage check block counts the number of the reset signals having a lower level than minimum level of the preferable reset signal. Then, the reset voltage check block determines whether or not the reset compensation control signal is generated based on a result of comparing the counted number with a predetermined count value.

Next, the reset voltage compensation block 503 compensates the reset signal outputted from each unit pixel in response to the reset compensation control signal.

Herein, in order to compensate the fixed pattern noise, the image sensor outputs the difference between the reset signal and the data signal as an image data after reading the reset signal and the data signal. Namely, the image sensor uses the correlated double sampling method (hereinafter, referred to as CDS method).

Meanwhile, the analog electric signal outputted from each unit pixel of the pixel array 501 should be converted into a digital electric signal in order to be processed in a digital system. In order to perform the above conversion, the analog to digital converter (ADC) 504 is included in the conventional CMOS image sensor. Namely, the ADC 504 first derives an analog image data from a data signal and a compensated reset signal and, then, converts the analog image data into a digital image data to thereby output the digital image data as the data. Herein, the data signal is outputted from each pixel and the compensated reset signal is outputted from the reset voltage compensation block 503.

The digital electric signal converted by the ADC 504 passes through the line memory 505. Herein, the line memory 505 includes a plurality of unit line memories. Each unit line memory is served as a buffer for helping functions of the image signal processor 506. The image signal processor 506 performs a lot of internal operations, e.g., an auto white balance, a color correction, a color interpolation, an auto exposure and the like. Using the above functions, the image signal processor 506 improves a quality of the digital electric signal, i.e., the data signal outputted from the pixel array 501.

Lastly, the control and interface block 507 uses a finite state machine FSM for controlling a lot of the internal operations of the CMOS image sensor and providing an interface between the CMOS image sensor and an external system. Also, the control and interface block 507 has a register, i.e., a kind of storage, for programming the internal operations of the CMOS image sensor and storing predetermined values used in the reset voltage check block 502 and the reset voltage compensation block 503. Namely, according to the programmed internal operations in the register, the control and interface block 507 controls the CMOS image sensor.

Contrary to the prior art, the image sensor in accordance with the present invention further includes the reset voltage check block 502 and the reset voltage compensation block 503. Hereinafter, referring to FIGS. 6 and 7, the reset voltage check block 502 and the reset voltage compensation block 503 are described in detail.

Figure 6:
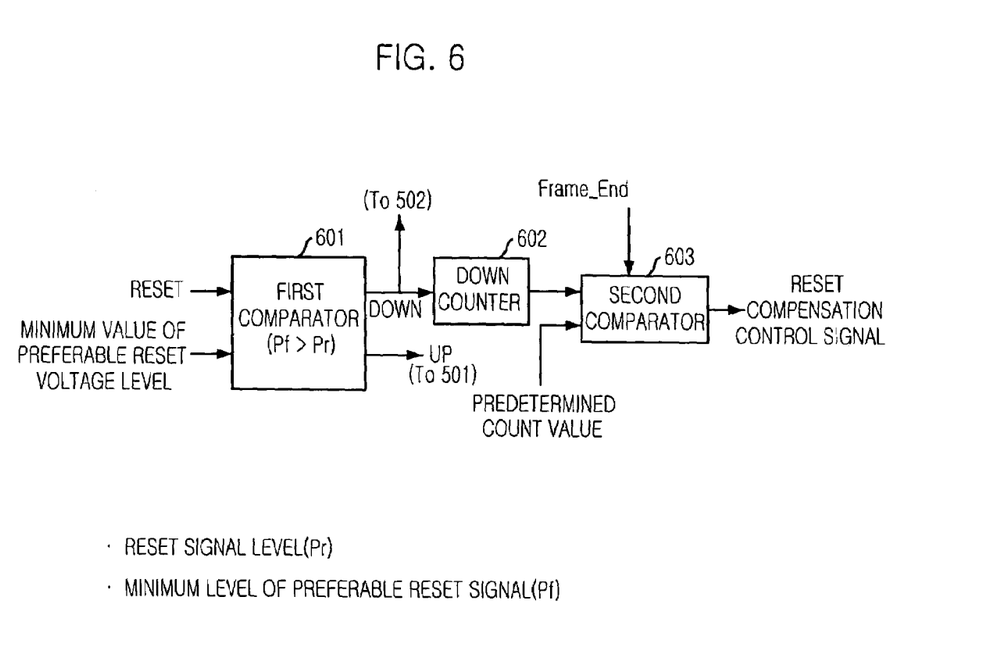
FIG. 6 is a block diagram describing a reset voltage check block of the CMOS image sensor in accordance with the present invention.

FIG. 6 is a block diagram describing a reset voltage check block of the CMOS image sensor in accordance with the present invention. Herein, Pr is a reset signal and Pf is the minimum level of the preferable reset signal. The preferable reset signal means a reset signal having at least predetermined level for being able to prevent the dark phenomenon that a detected image for a bright object like the sun becomes darker than its original when strong light is inputted from the object. Of course, the minimum level of the preferable reset signal can be adjusted by an external system or a user.

As shown, the reset voltage check block includes a first comparator 601, a down counter 602 and a second comparator 603.

The first comparator 601 receives each reset signal outputted from each unit pixel and compares the level of each reset signal with the minimum level of the preferable reset signal to thereby generate one of up and down signals. Namely, if the level of the reset signal is lower than the minimum level of the preferable reset signal, the down signal DOWN is generated; and, otherwise, the up signal UP is generated.

Then, the down counter 602 counts the down signal outputted from the first comparator in order to check the number of the reset signals having lower level than the minimum level of the preferable reset signal in one frame. Herein, it is unnecessary to count the up signal UP. If the up signal UP is generated, the reset signal outputted from the unit pixel is acceptable.

Furthermore, a moving image is constituted with 20-30 frames and each frames includes N×M data because the pixel array has the N×M unit pixels. As a result, after counting the down signals on the N×M unit pixels, the down counter 602 is initialized.

Lastly, the second comparator 603 compares a counted value of the down signal, i.e., the number of the reset signals having lower level than the minimum level of the preferable reset signal in one frame, with the predetermined count value. According to above comparison result, the second comparator 603 generates the reset compensation control signal if the counted value of the down signal is larger than the predetermined count value. The second comparator is controlled by a frame ending signal Frame_End which represents an end of each frame. Herein, the predetermined count value means the minimum acceptable number of the reset signals having a lower level than the minimum level of the preferable reset signal in one frame.

Namely, in the N×M unit pixels, if the number of unit pixels having a lower level than the minimum level of the preferable reset signal is larger than the predetermined count value, the image sensor estimates that strong light is inputted from the object. As a result, the reset compensation control signal is generated. However, if not, the reset compensation control signal is not generated, i.e., not activated.

Figure 7:
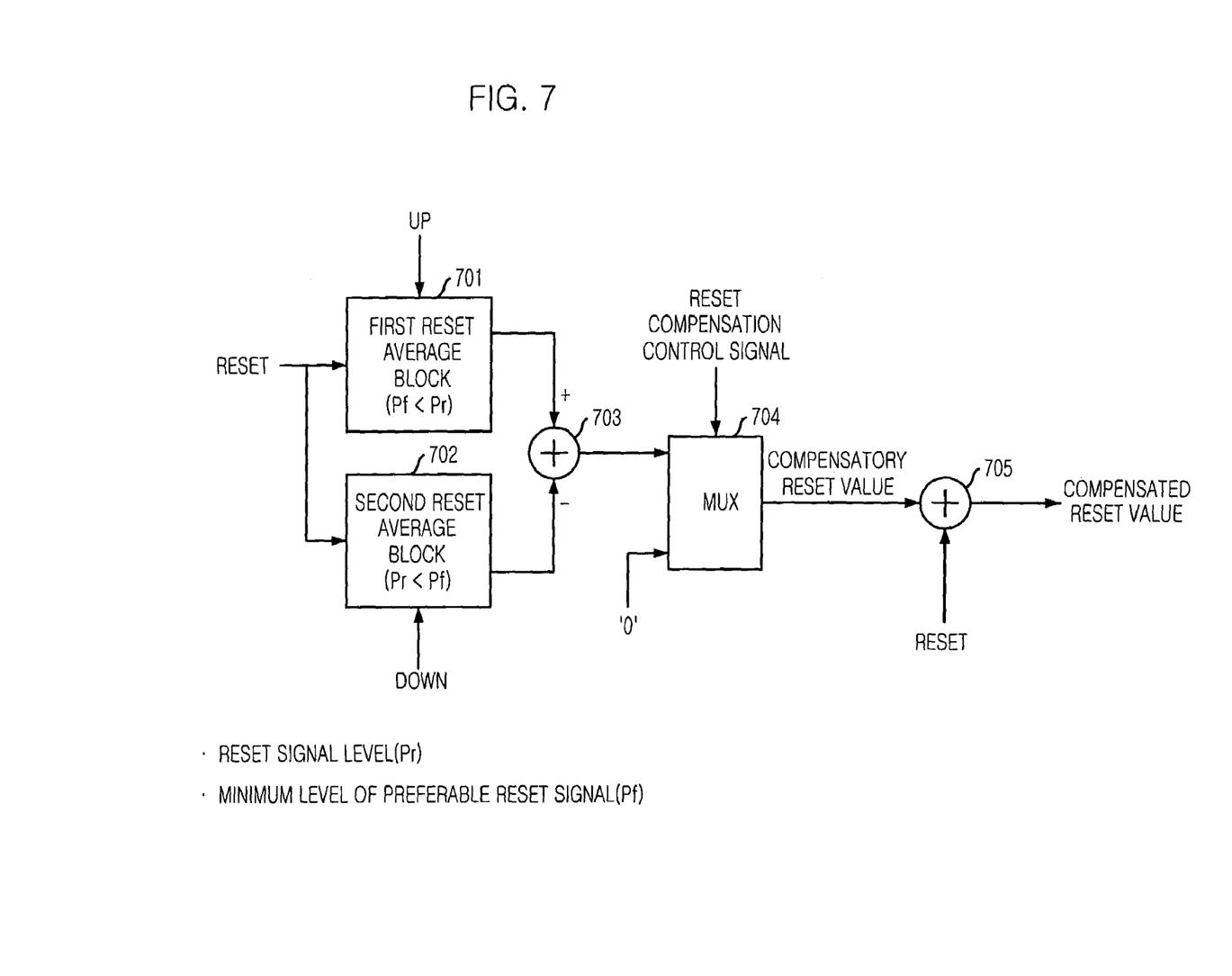
FIG. 7 is a block diagram describing a reset voltage compensation block of the CMOS image sensor in accordance with the present invention.

FIG. 7 is a block diagram describing a reset voltage compensation block of the CMOS image sensor in accordance with the present invention.

As shown, the reset voltage compensation block 503 includes a first reset average block 701, a second reset average block 702, a calculating block 703 and a multiplexer 704.

In detail, the first reset average block 701 receives first reset signals and the up signals UP and generates a first average of the first reset signals. Herein, the first reset signal corresponding to the up signals UP has a higher level than the minimum level of the preferable reset signal.

Next, the second reset average block 702 receives second reset signals and the down signals DOWN and generates a second average of the second reset signals. Herein, the second reset signal corresponding to the down signals DOWN has a lower level than the minimum level of the preferable reset signal. Moreover, the first and second reset average blocks 701 and 702 are initialized every frame Then, the calculating block 703 subtracts the second average from the first average to thereby output a result value to the multiplexer 704. The multiplexer 704 selectively outputs one of a predetermined value and the result value outputted from the calculating block 703 as a compensatory reset value in response to the reset compensation control signal. Namely, if the reset compensation control signal is activated, the multiplexer 704 outputs the result value outputted from the calculating block 703 as a compensatory reset value; and, otherwise, the multiplexer 704 outputs the predetermined value as the compensatory reset value. Herein, the predetermined value is '0'. This case that the multiplexer 704 outputs '0' as the compensatory reset value is the same as each reset signal outputted from each unit pixel is not compensated.

Furthermore, as not shown in FIG. 7, the reset voltage compensation block 503 includes a summation block for adding each reset signal outputted from each unit pixel and the compensatory reset value outputted from the multiplexer to thereby output a resultant signal as the compensated reset signal.

As described above, in the present invention, the image sensor determines whether or not compensating the reset signal of the present frame by using information of the prior frame. Also, the image sensor determines the compensatory reset value by using information of the prior frame.

Therefore, in the present frame, the reset signal having a lower level than the minimum level of the preferable reset signal can be compensated by adding the compensatory reset value thereto. This operation is repeatedly performed every frame.

As a result, the present invention can effectively reduce a dark phenomenon in a bright object, e.g., a light source to thereby improve a quality of an image sensor.

The present application contains subject matter related to Korean patent application No. 2003-27736, filed in the Korean Patent Office on Apr. 30, 2003, the entire contents of which being incorporated herein by reference.

While the present invention has been described with respect to the particular embodiments, it will be apparent to those skilled in the art that various changes and modification may be made without departing from the spirit and scope of the invention as defined in the following claims.

What is claimed is:

1. An image sensor for obtaining a digital image data by using a correlated double sampling method unrelated to an intensity of inputted light, comprising:
   a pixel array including N×M unit pixels;
   a reset voltage check block for receiving each reset signal outputted from each unit pixel and comparing a level of each reset signal with a minimum level of a preferable reset signal to thereby generate a reset compensation control signal;
   a reset voltage compensation block for compensating the reset signal outputted from each unit pixel in response to the reset compensation control signal to generate a compensated reset signal; and
   an analog to digital converter for deriving an analog image data by using a data signal outputted from the pixel array and the compensated reset signal to convert the analog image data into the digital image data,
   wherein the reset voltage check block includes:
      a first comparator for receiving each reset signal outputted from each unit pixel and comparing the level of each reset signal with a minimum level of the preferable reset signal to thereby generate one of up and down signals;
      a down counter for counting the down signal outputted from the first comparator; and
      a second comparator for comparing a counted value of the down signal with a predetermined count value and generating the reset compensation control signal if the counted value of the down signal is larger than the predetermined count value.

2. The image sensor as recited in claim 1, further comprising:
   a line memory for buffering the digital image data outputted from the analog to digital converter in a line by line basis;
   a image signal processor for receiving the digital image data outputted from the line memory and performing internal operations in order to increase a quality of the digital image data; and
   a control and interface block for controlling the internal operations of the image signal processor and the pixel array and providing an interface between the CMOS image sensor and an external system.

3. The image sensor as recited in claim 2, wherein the internal operations includes a color interpolation, a color correction, an auto white balance, an auto exposure, a gamma correction, a color space conversion, an image adjustment, an edge enhancement, an auto focus and an auto zoom.

4. The image sensor as recited in claim 1, wherein the second comparator is controlled by a frame ending signal.

5. The image sensor as recited in claim 4, wherein the predetermined count value means the minimum acceptable number of the reset signals having a lower level than the minimum level of the preferable reset signal in one frame.

6. The image sensor as recited in claim 1, wherein the reset voltage compensation block includes:
   a first reset average block for receiving first reset signals and generating a first average of the first reset signals;
   a second reset average block for receiving second reset signals and generating a second average of the second reset signals;
   a calculating block for subtracting the second average from the first average; and
   a multiplexer for selectively outputting one of a predetermined value and an result value outputted from the calculating block as a compensatory reset value in response to the reset compensation control signal,
   wherein the first reset signal has a higher level than the minimum level of the preferable reset signal and the second reset signal has a lower level than the minimum level of the preferable reset signal.

7. The image sensor as recited in claim 6, wherein the predetermined value is '0'.

8. The image sensor as recited in claim 6, wherein the reset voltage compensation block further includes a summation block for adding each reset signal outputted from each unit pixel and the compensatory reset value outputted from the multiplexer to thereby output a resultant signal as the compensated reset signal.

* * * * *